(12) United States Patent
Ahn

(10) Patent No.: US 6,366,423 B1
(45) Date of Patent: Apr. 2, 2002

(54) DATA STORAGE MEDIUM HAVING SERVO PATTERN OF DIFFERENT PHASE AND TRACKING METHOD THEREOF

(75) Inventor: Young-sub Ahn, Suwon (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/255,782

(22) Filed: Feb. 23, 1999

(30) Foreign Application Priority Data

Feb. 23, 1998 (KR) .............................. 98-5599

(51) Int. Cl.$^7$ .............................. G11B 5/596
(52) U.S. Cl. .................. 360/77.08; 360/77.02
(58) Field of Search .......... 360/77.02, 77.08, 360/55, 48, 39

(56) References Cited

U.S. PATENT DOCUMENTS

| | | | | |
|---|---|---|---|---|
| 4,490,756 A | * | 12/1984 | Dost et al. ................ | 360/77.08 |
| 4,511,938 A | | 4/1985 | Betts | |
| 5,453,887 A | | 9/1995 | Negishi et al. | |
| 5,615,065 A | * | 3/1997 | Cheung .................. | 360/77.08 |
| 5,818,659 A | * | 10/1998 | Cheung et al. .......... | 360/77.08 |
| 5,923,492 A | * | 7/1999 | Liikanen ................. | 360/77.08 |
| 6,025,970 A | * | 2/2000 | Cheung .................. | 360/77.08 |

FOREIGN PATENT DOCUMENTS

| | | |
|---|---|---|
| EP | 0 578 598 A2 | 12/1994 |
| JP | 58-222467 | 12/1983 |
| JP | 3-225684 | 10/1991 |

* cited by examiner

*Primary Examiner*—David Hudspeth
*Assistant Examiner*—K. Wong
(74) *Attorney, Agent, or Firm*—Robert E. Bushnell, Esq.

(57) ABSTRACT

In a data storage medium, which includes a servo information area where information on the position of a head is recorded and a data information area where actual data information is recorded, the servo information area is divided into an A/B burst section and a C/D burst section, and the A/B burst section has a servo pattern in which phases of burst signals A and B are recorded to be different from each other and the C/D burst section has a servo pattern in which phases of burst signals C and D are recorded to be different from each other. Thus, when the length of a bit recorded on a data storage medium is reduced considerably, an output signal of a head and a burst signal can be detected without distortion and accordingly an accurate control of head tracking is possible.

9 Claims, 7 Drawing Sheets

DATA STORAGE MEDIUM HAVING SERVO PATTERN OF DIFFERENT PHASE AND TRACKING METHOD THEREOF

CLAIM OF PRIORITY

This application makes reference to, incorporates the same herein, and claims all benefits accruing under 35 U.S.C §119 from an application entitled Hard Disk Having Servo Pattern Of Different Phase And Tracking Method Thereof earlier filed in the Korean Industrial Property Office on Feb. 23, 1998, and there duly assigned Serial No. 98-5599 by that Office.

BACKGROUND OF THE INVENTION

1. Field of the Invention

The present invention relates to a servo control of a data storage medium drive, and more particularly, to a data storage medium in which accurate tracking control is possible for a high density product by improving the servo pattern recorded on the disk, and a method of controlling tracking of a head on the disk.

2. Description of the Related Art

To improve the recording capacity of a hard disk, it is necessary to improve not only the data recording and reproduction capability but also the capability of controlling the position of a recording/reproducing head. In a conventional hard disk drive, a method of recording and reading position information on and from a disk for a servo control depends on a DC component of a signal detected by a fall-wave rectifier and an integrator using the presence of a burst signal.

The servo of a hard disk drive is classified according to the method of recording servo information on a disk where data is recorded. An embedded servo method is usually used to provide servo position information. In the embedded servo method, servo information is recorded on all surfaces of a disk at a predetermined interval and data is recorded on all other areas. A servo information section and a data information section are alternatively located in a single track on the disk. The servo information section, where information on the position of a head is recorded, includes track position information, a track address, index information, and search information. Actual data information is recorded in the data information section.

Figure 1A:
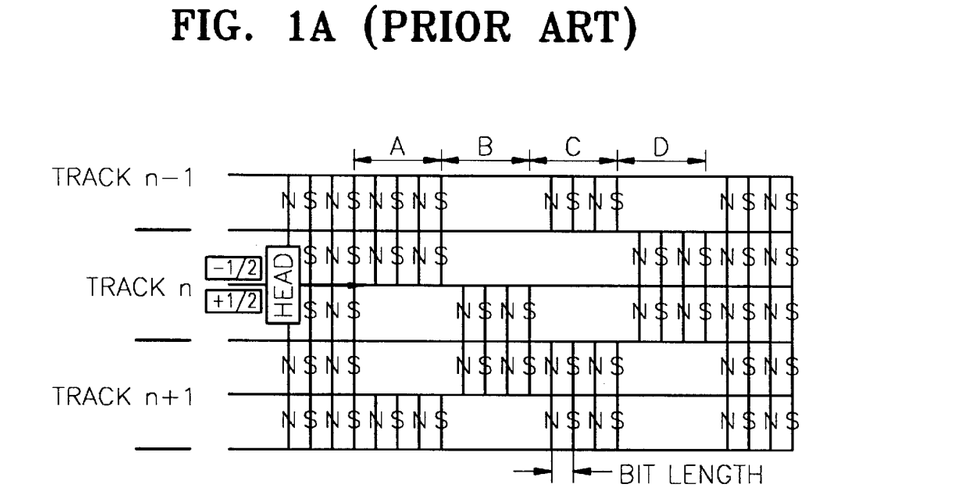
FIGS. 1A through 1D are views for explaining a method of controlling the position of a head according to the conventional technology.
Figure 1B:
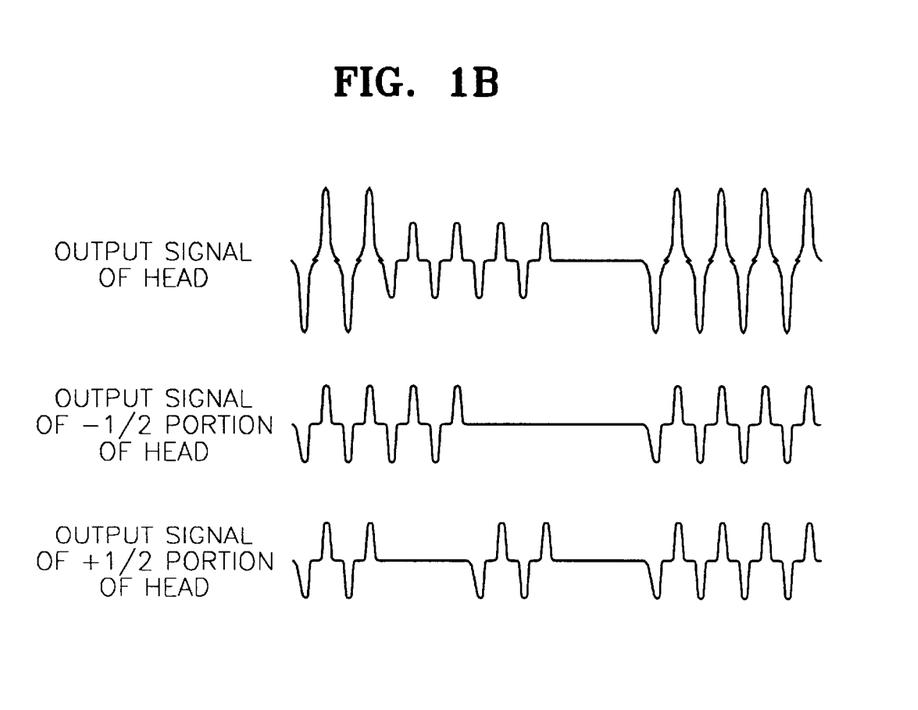
Figure 1C:
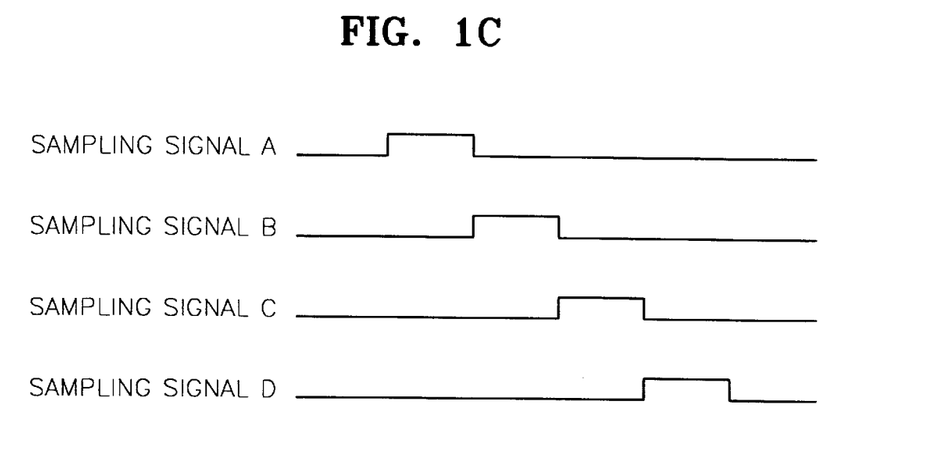
Figure 1D:
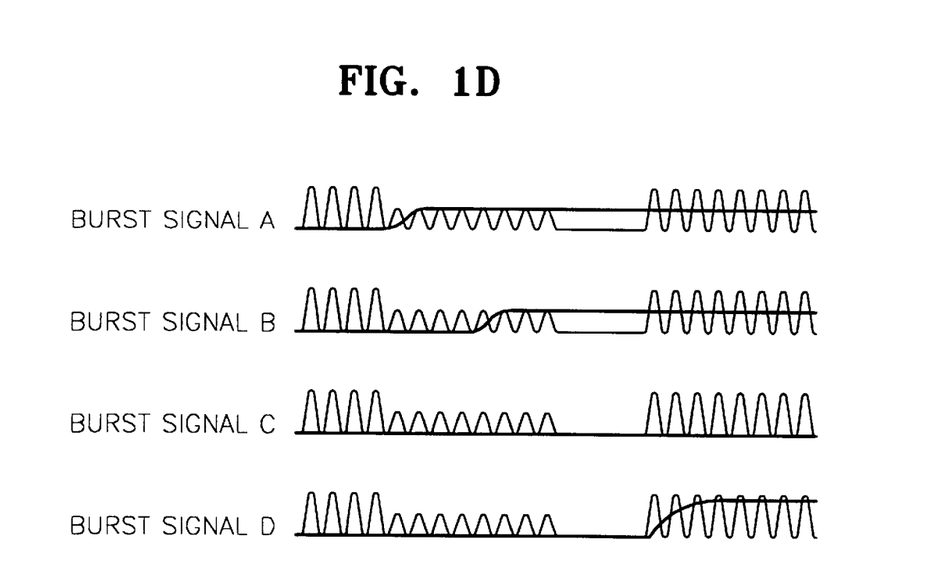

A method of controlling the position of a head according to the conventional technology is explained with reference to FIGS. 1A through 1D. Here, FIG. 1A shows a servo pattern recorded on a hard disk; FIG. 1B shows an output signal detected by the head; FIG. 1C shows sampling signals A, B, C and D; and FIG. 1D shows burst signals A, B, C and D.

The servo section of a disk is divided into several sections such as A, B, C and D. Signals that are recorded in each servo burst area of the sections A, B, C and D, the servo burst area corresponding to half the track width, are read and pass through full-wave rectification and integration to detect a DC component. By putting a boundary between a section where the value of the DC component detected from the A and B bursts becomes maximum and a section where the value of the DC component becomes minimum at the center of the track, and comparing the sizes of the DC components generated due to superposition of the two components, a degree of deviation of the head from the center of the track can be determined.

The above method can be effective when the recording density is low. However, as the recording density increases and the length of a bit of a servo signal is considerably reduced, the DC component of an output signal of the head can be affected in a section with no servo burst signal.

Figure 2A:
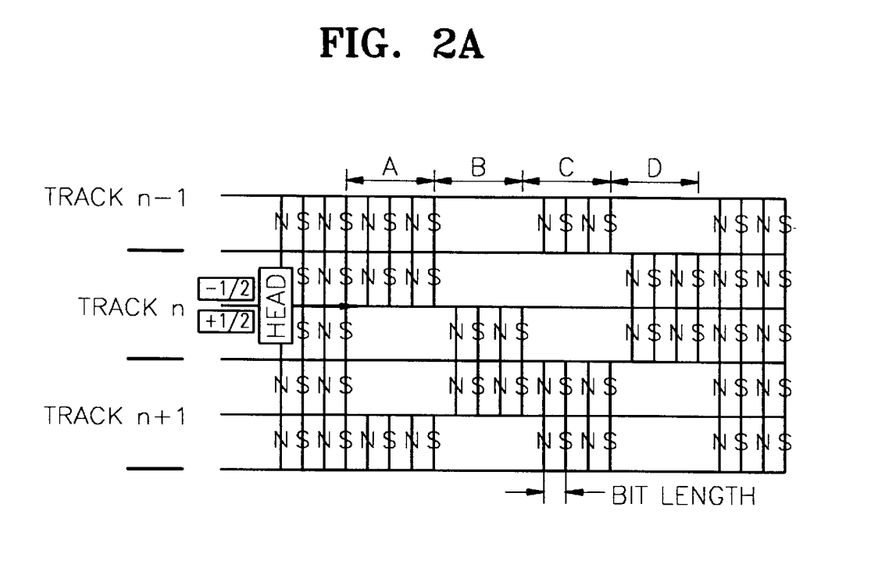
FIGS. 2A through 2D are views for explaining a problem when the length of a bit of a servo signal is considerably reduced.
Figure 2B:
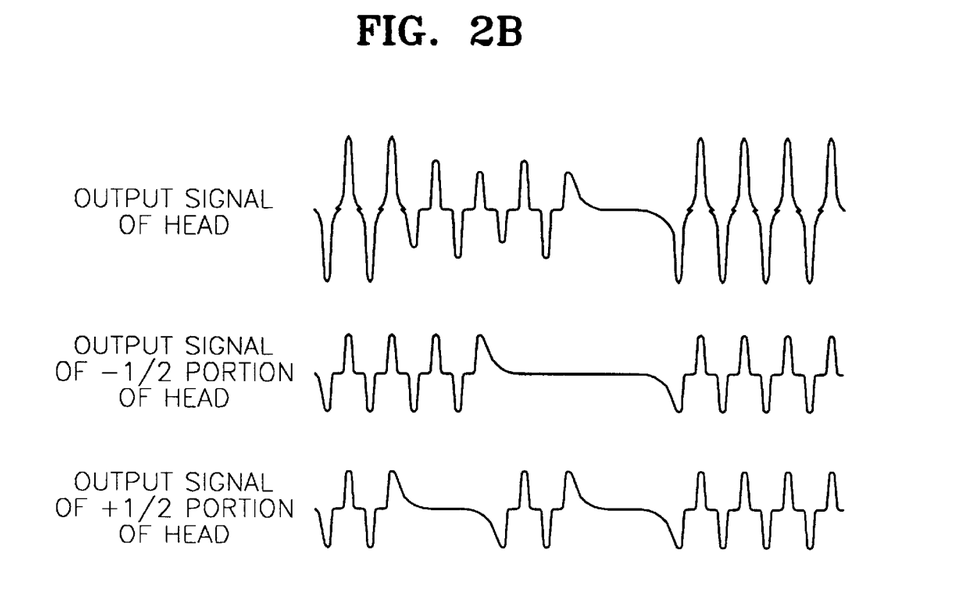
Figure 2C:
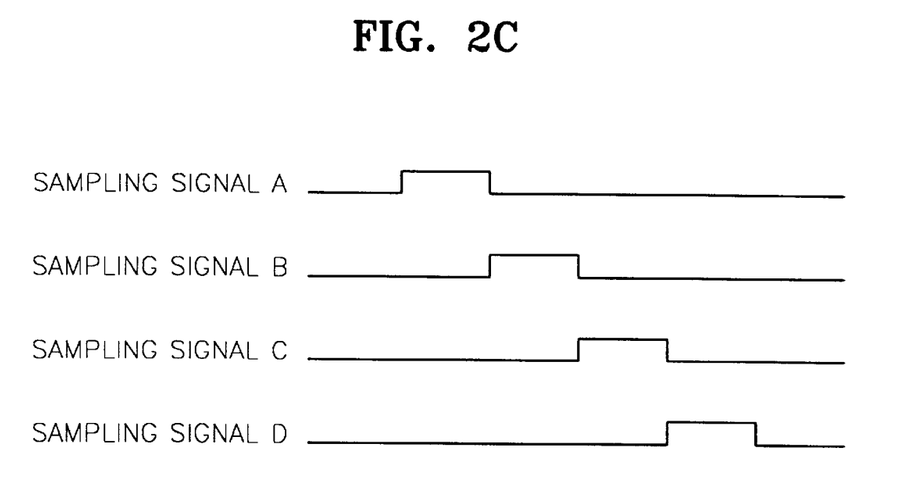
Figure 2D:
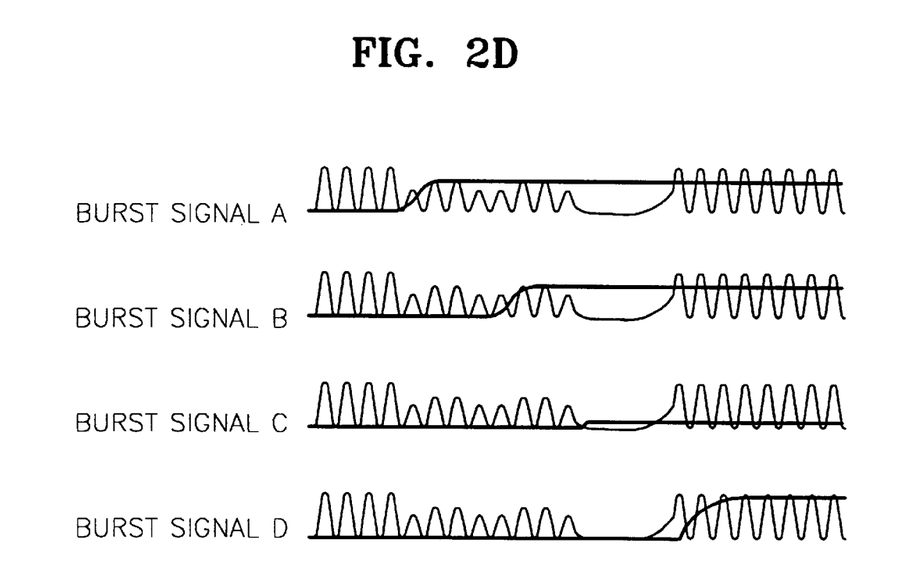

FIGS. 2A through 2D are views for explaining a problem when the length of a bit of a servo signal is considerably reduced as above. Here, FIG. 2A shows a servo pattern recorded on a hard disk; FIG. 2B shows an output signal detected by the head; FIG. 2C shows sampling signals A, B, C and D; and FIG. 2D shows burst signals A, B, C and D.

Referring to FIG. 2B, a transitional section from the S pole to the N pole in a section without a signal on a disk changes gradually, which is different from FIG. 1B, so that the output signals and burst signals of the −1/2 and +1/2 sections of a head appear to be distorted. Thus, as shown in FIG. 2D, since the burst signals A, B, C and D are detected to be distorted, the position information cannot be identified accurately.

SUMMARY OF THE INVENTION

To solve the above problem, it is an objective of the present invention to provide a data storage medium having a servo signal by which a head output signal and a burst signal can be detected without distortion even when the length of a bit recorded on a disk is considerably reduced.

It is another objective of the present invention to provide a method of controlling tracking of a head by reading the recorded servo signal from a data storage medium drive.

Accordingly, to achieve the first objective, there is provided a data storage medium including a servo information area where information on the position of a head is recorded and a data information area where actual data information is recorded, in which the servo information area is divided into an A/B burst section and a C/D burst section, the A/B burst section having a servo pattern in which phases of burst signals A and B are recorded to be different from each other and the C/D burst section having a servo pattern in which phases of burst signals C and D are recorded to be different from each other.

It is preferred in the present invention that the servo pattern recorded in the A/B burst section includes the burst signal A recorded in the +1/2 head portion of the $(n-1)^{th}$ track and the −1/2 head portion of the $n^{th}$ track, and the burst signal B, having a phase different from the burst signal A, recorded in the +1/2 head portion of the $n^{th}$ track and the −1/2 head portion of the $(n+1)^{th}$ track, corresponding to the portion where the burst signal A is recorded.

Also, it is preferred in the present invention that the servo pattern recorded in the C/D burst section includes the burst signal C recorded in the −1/2 head portion 0f the $(n+1)^{th}$ track and the +1/2 head portion of the $(n+1)^{th}$ track, and the burst signal D, having a phase different from the burst signal C, recorded in the −1/2 head portion of the n track and the +1/2 head portion of the $n^{th}$ track, corresponding to the portion where the burst signal C is recorded.

To achieve the second objective, there is provided a method of controlling tracking of a head to determine a degree of deviation of the head from the center of a track in a data storage medium drive, in which a servo information area, where information on a position of the head is recorded, is divided into an A/B burst section and a C/D burst section, and includes a servo pattern that phases of burst signals A and B are recorded to be different from each other in the A/B burst section and phases of burst signals C and D are recorded to be different from each other in the C/D burst section, the method comprising the steps of: detecting a burst signal recorded in the servo pattern as the head moves along a track; generating sampling signals A and B to have a phase difference as great as that between the burst signals A and B and generating sampling signals C and D to have a phase difference as great as that between burst signals C and D; generating the burst signals A, B, C and D from head output signals detected according to the sampling signals; and determining the degree of deviation of the head from the center of the track from the magnitudes of DC components of the burst signals.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 3A:
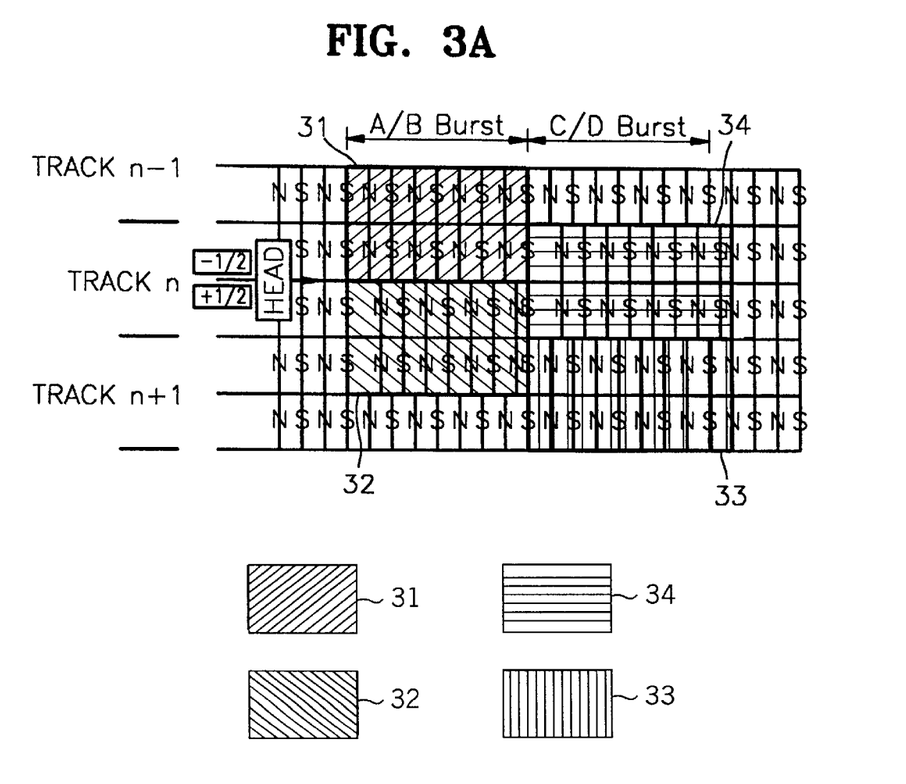
FIGS. 3A through 3D are views to show the format of a servo pattern on a data storage medium and a method for controlling tracking of a head, according to the present invention.
Figure 3B:
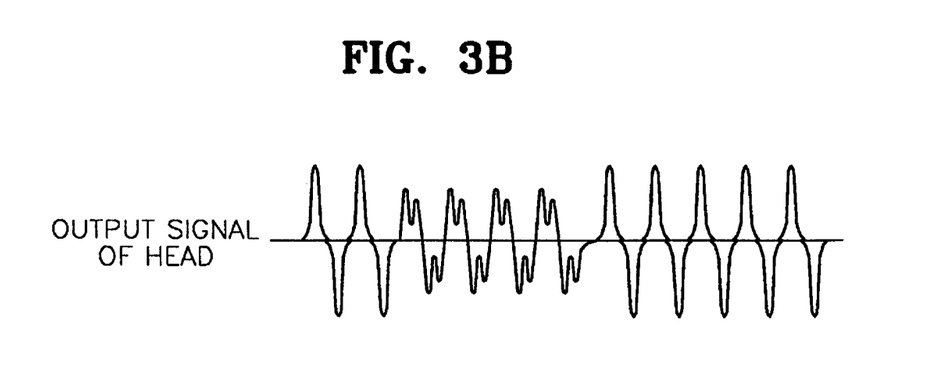
Figure 3C:
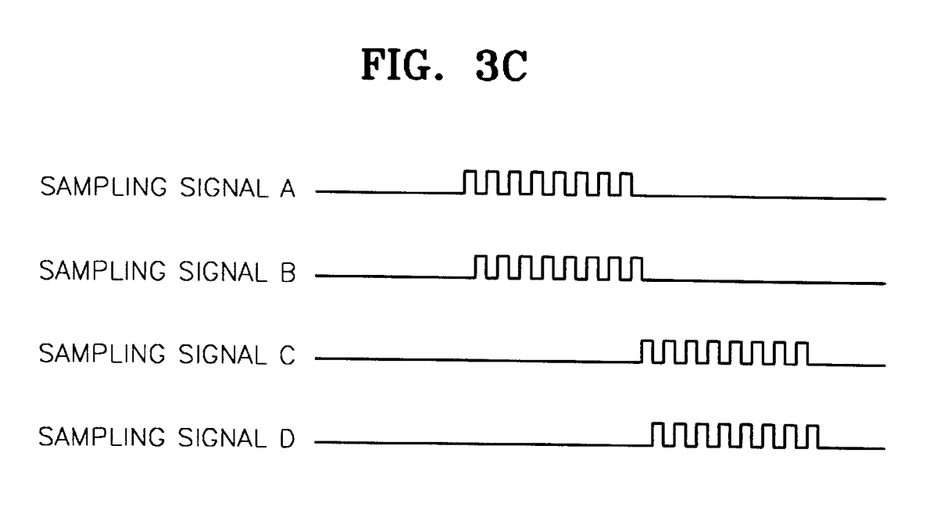
Figure 3D:
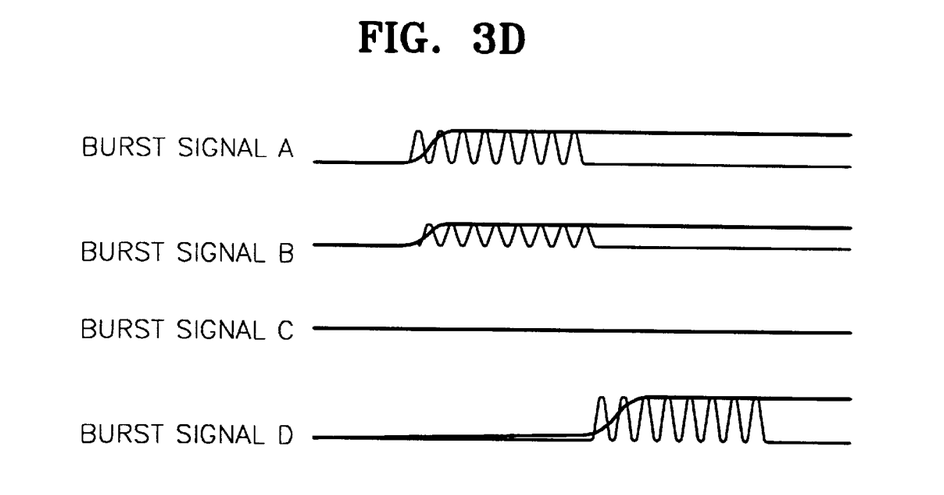

FIGS. 3A through 3D are views to show the format of a servo pattern on a data storage medium and a method for controlling tracking of a head, according to the present invention. Here, FIG. 3A shows a servo pattern recorded on a data storage medium; FIG. 3B shows an output signal detected by a head; FIG. 3C shows sampling signals A, B, C and D; and FIG. 3D shows burst signals A,B,C and D.

Referring to FIG. 3A, the servo information area of a data storage medium is divided into a burst A/B section and a burst C/D section. The phases of burst signals A and B (31 and 32) recorded in the burst A/B section are recorded differently from one another, and the phases of burst signals C and D (33 and 34) recorded in the burst C/D section are also recorded differently from one another.

That is, the burst signal A (31) is recorded in the +1/2 head portion of $(n-1)^{th}$ track and the -1/2 head portion of $n^{th}$ track, the burst signal B (32) having a phase different from the burst signal A (31) is recorded in the +1/2 head portion of $n^{th}$ track and the -1/2 head portion of $(n+1)^{th}$ track, corresponding to the portion where the burst signal A (31) is recorded. Meanwhile, the burst signal C (33) is recorded in the -1/2 head portion of $(n+1)^{th}$ track and the +1/2 head portion of $(n+1)^{th}$ track, the burst signal D (34) having a phase different from the burst signal C (33) is recorded in the -1/2 head portion of $n^{th}$ track and the +1/2 head portion of $n^{th}$ track, corresponding to the portion where the burst signal C (33) is recorded. Here, although the phases of burst signals A and B and the phases of burst signals C and D are respectively different from one another, the phases of burst signals A and C and the phases of burst signals B and D each are made equal.

FIG. 3B shows an output signal of the head detected from the servo pattern signal recorded as shown in FIG. 3A. The drawing shows a head output signal detected when the head, which should move along the center of the $n^{th}$ track, deviates slightly toward the $(n-1)^{th}$ track.

Although the burst signals A and B are positioned at the same time section, since the phases of the signals are recorded differently, the burst signals A and B as shown in FIG. 3D are detected from the output signal of the head as shown in FIG. 3B, using the sampling signals having different phases as shown in FIG. 3C. The burst signals C and D are detected in the same manner.

In FIG. 3D, it can be seen that the magnitude of the burst signal A (31) is greater than that of the burst signal B (32) since the current position of the head is slightly deviated toward the $(n-1)^{th}$ track.

Figure 4:
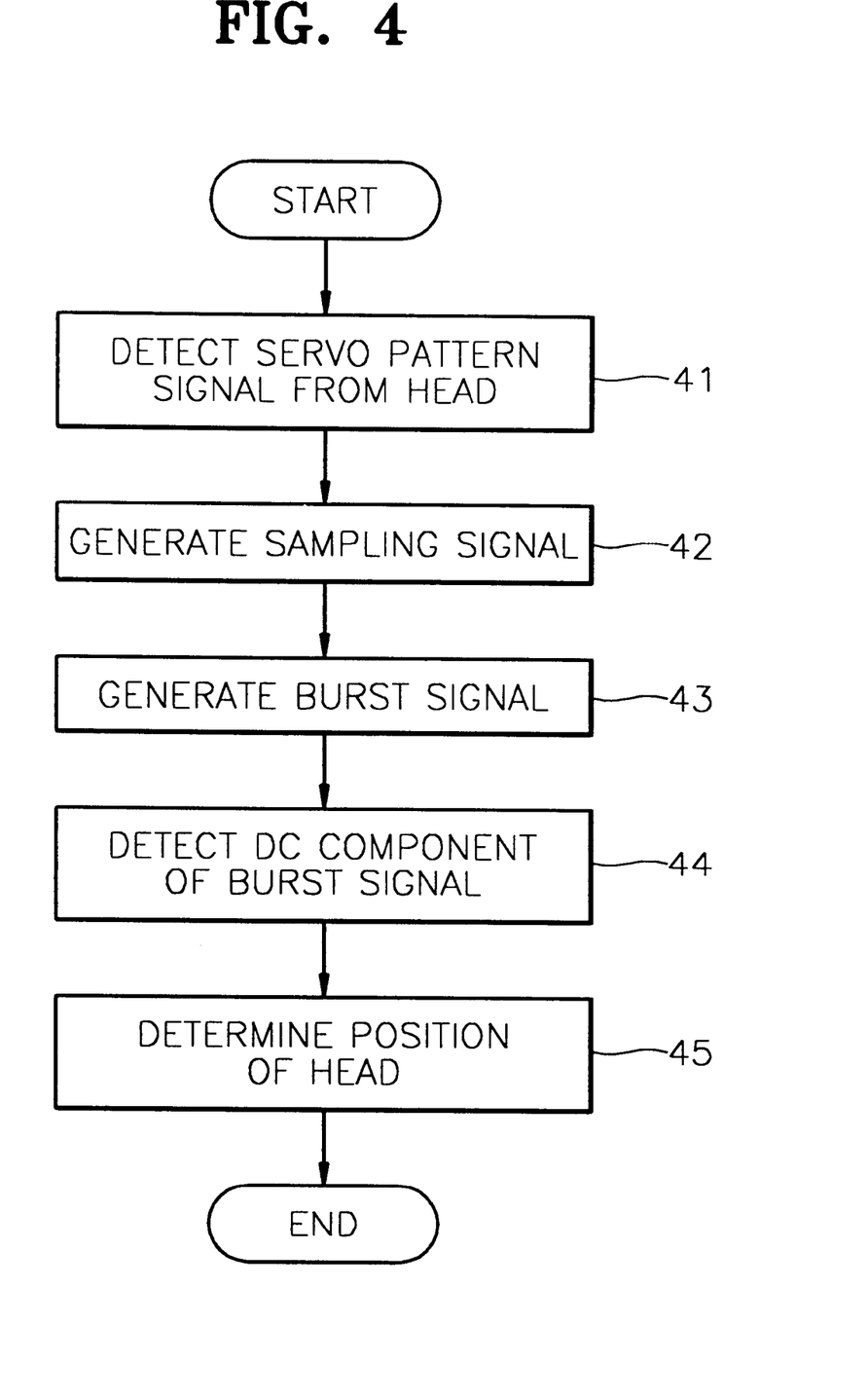
FIG. 4 is a flow chart for explaining a tracking method of a data storage medium according to the present invention.

FIG. 4 shows the process of a method of controlling tracking of a data storage medium according to the present invention. The method determines the degree of deviation of the head from the center of a track of the data storage medium where a servo pattern is recorded as shown in FIG. 3A.

First, while moving along a track, a head detects a signal recorded in a servo pattern (step 41). The signal detected is shown in FIG. 3B. Next, sampling signals A and B are generated to have a phase difference as great as that between burst signals A and B, as shown in FIG. 3C. Also, sampling signals C and D are generated to have a phase difference as great as that between burst signals C and D (step 42). Burst signals A, B, C and D are generated from the output signals of the head according to the respective sampling signals (step 43). The burst signals generated are shown in FIG. 3D. After the signal recorded in each servo burst area is read, a DC component is detected by full wave-rectifying and integrating each of the burst signals (step 44). The degree of deviation of the head from the center of the track is determined from the detected DC component (step 45).

That is, as shown in FIG. 3D, when it appears that the magnitude of the burst signal A (31) is greater than that of the burst signal B (32), the current position of the head is determined to be deviated slightly toward the $(n-1)^{th}$ track.

As described above, according to a data storage medium where a servo pattern having different phases is recorded and a tracking method thereof according to the present invention, the phases of the burst signals A and B are recorded differently from each other and the phases of the burst signals C and D are recorded differently from each other, and then tracking of the head is controlled using a servo pattern recorded above. Thus, when the length of a bit recorded on a data storage medium is reduced considerably, an output signal of a head and a burst signal can be detected without distortion and accordingly an accurate control of head tracking is possible.

What is claimed is:

1. A data storage medium including:

a servo information area where information on the position of a head is recorded and a data information area where actual data information is recorded, wherein said servo information area is divided into first and second time interval areas comprising:

an A/B burst section area having a first servo pattern including a burst signal A and a burst signal B disposed in said first time interval area, wherein phases of said burst signals A and B are recorded to be different from each other: and a C/D burst section area having a second servo pattern including a burst signal C and a burst signal D disposed in said second time interval area, wherein phases of said burst signals C and D are recorded to be different from each other.

2. The data storage medium as claimed in claim 1, wherein said servo pattern recorded in said A/B burst section comprises:

the burst signal A recorded in the +1/2 head portion of the $(n-1)^{th}$ track and the −1/2 head portion of the $n^{th}$ track; and the burst signal B, having a phase different from said burst signal A, recorded in the +1/2 head portion of the $n^{th}$ track and the −1/2 head portion of the $(n+1)^{th}$ track, corresponding to the portion where said burst signal A is recorded.

3. The data storage medium as claimed in claim 1, wherein said servo pattern recorded in said C/D burst section comprises:

the burst signal C recorded in the −1/2 head portion of the $(n+1)^{th}$ track and the +1/2 head portion of the $(n+1)^{th}$ track; and the burst signal D, having a phase different from said burst signal C, recorded in the −1/2 head portion of the $n^{th}$ track and the +1/2 head portion of the $n^{th}$ track, corresponding to the portion where said burst signal C is recorded.

4. The data storage medium as claimed in claim 2, wherein said servo pattern recorded in said C/D burst section comprises:

the burst signal C recorded in the −1/2 head portion of the $(n+1)^{th}$ track and the +1/2 head portion of the $(n+1)^{th}$ track; and the burst signal D, having a phase different from said burst signal C, recorded in the −1/2 head portion of the $n^{th}$ track and the +1/2 head portion of the nth track, corresponding to the portion where said burst signal C is recorded.

5. The data storage medium as claimed in claim 3, wherein said servo pattern recorded in said A/B burst section comprises:

the burst signal A recorded in the +1/2 head portion of the $(n-1)^{th}$ track and the −1/2 head portion of the nth track; and the burst signal B, having a phase different from said burst signal A, recorded in the +1/2 head portion of the $n^{th}$ tack and the −1/2 head portion of the $(n+1)^{th}$ track, corresponding to the portion where said burst signal A is recorded.

6. The data storage medium as claimed in claim 1, wherein said burst signals A and C have the same phase and said burst signals B and D have the same phase.

7. A method of controlling tracking of a head to determine a degree of deviation of the head from the center of a track in a high density data storage medium including:

a data information area where actual data information is recorded; and a servo information area where information on the position of a head is recorded, wherein said servo information area is divided into first and second time interval areas comprising:

an A/B burst section area having a first servo pattern including a burst signal A and a burst signal B recorded in said first time interval area, wherein phases of said burst signals A and B are recorded to be different from each other: and a C/D burst section area having a second servo pattern including a burst signal C and a burst signal D recorded in said second time interval area, wherein phases of said burst signals C and D are recorded to be different from each other, said method comprising:

simultaneously detecting said burst signals A and B recorded in said first servo pattern during a time period corresponding to said first time interval area as said head moves along a track;

simultaneously detecting said burst signals C and D recorded in said second servo pattern during a time period corresponding to said second time interval area as said head moves along a track;

generating sampling signals A and B to have a phase difference as great as that between said burst signals A and B;

generating sampling signals C and D to have a phase difference as great as that between burst signals C and D;

generating, from head output signals detected according to said sampling signals, the burst signals A and B;

generating, from head output signals detected according to said sampling signals, the burst signals C and D; and determining the degree of deviation of said head from the center of the track from the magnitudes of DC components of said burst signals A, B, C and D.

8. A data storage medium comprising:

a servo information area where information regarding head position is recorded, said servo information area being divided into an A/B burst section disposed in a first time interval area and a C/D burst section disposed in a second time interval area, said A/B burst section comprising:

burst signals A and B recorded as a first servo pattern in which phases of the burst signals A and B are recorded to be different from each other, said burst signal A being recorded at said first time interval area to be equally divided over a portion of a first track and a portion of a second track adjacent said first track, and said burst signal B being recorded at said first time interval area to be equally divided over another portion of said second track and a portion of a third track adjacent said second track;

said C/D burst section comprising:

burst signals C and D recorded as a second servo pattern in which phases of the burst signals C and D are recorded to be different from each other, said burst signal C being recorded at said second time interval area on said third track, and said burst signal D being recorded at said second time interval area on said second track; and a data information area where actual data information is recorded.

9. The data storage medium as claimed in claim 8, wherein said burst signals A and C have the same phase and said burst signals B and D have the same phase.

* * * * *